G. R. Nebinger,
Hinge.
N° 66,729.  Patented July 16, 1867.
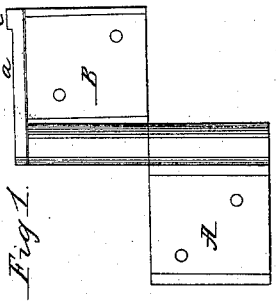
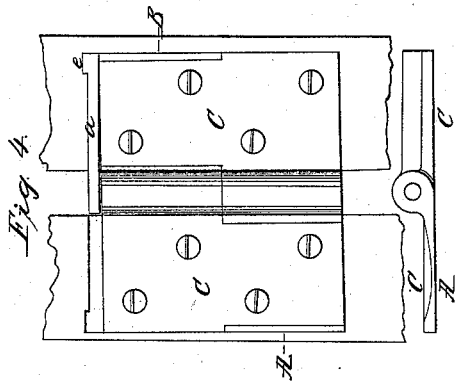
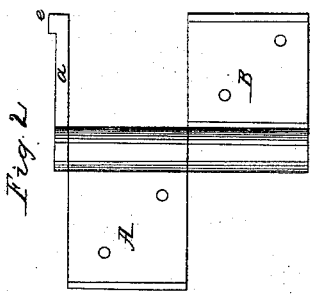
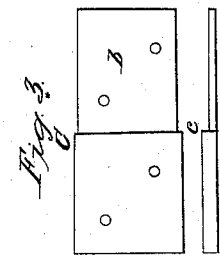
Witnesses:
O. T. Dodge
W. W. Dodge
Inventor:
G. R. Nebinger
By W. W. Dodge
Attorney.

United States Patent Office.

GEORGE R. NEBINGER, OF LEWISBURG, PENNSYLVANIA.

Letters Patent No. 66,729, dated July 16, 1867; antedated July 5, 1867.

IMPROVEMENT IN HINGES.

The Schedule referred to in these Letters Patent and making part of the same.

TO ALL WHOM IT MAY CONCERN:

Be it known that I, GEORGE R. NEBINGER, of Lewisburg, in the county of York, and State of Pennsylvania, have invented certain new and useful Improvements in Hinges; and I do hereby declare that the following is a full, clear, and exact description thereof, reference being had to the accompanying drawings, making part of this specification, and to the letters of reference marked thereon—

Like letters indicating like parts wherever they occur.

To enable others skilled in the art to construct and use the invention, I will proceed to describe it.

My invention consists in so constructing a hinge that it shall be a loose-joint hinge, and at the same time can be used as a right or left-hand hinge at will.

I first construct the wings A and B, making them just half the length that the hinge is to be when complete, and secure them by a pin that can be withdrawn, as shown in fig. 1, the pin being inserted in the usual manner to form the joint. These wings are made concave on their front face, as shown more clearly in the end view of fig. 4. I then construct a plate, C, as shown in fig. 3, the portion $b$ of which is made convex on its rear face to fit into the concavity of the wings A and B, the portion $c$ being as thick as both the wing and the part $b$, when the two latter are united, there being a shoulder at $c$, as shown in fig. 3, so that when the plates $c$ are united to the wings A and B, as in fig. 4, the two parts of the hinge will be of uniform thickness throughout their entire length from top to bottom. Holes are made in the wings, and also in the plates C, so that when thus united, screws will pass through both, and hold them firmly in place. The pin which unites the wings has an arm, $a$, attached to its upper end, as shown in figs. 1, 2, and 4, which fits into a recess cut for it in the frame, as shown in fig. 4, the shoulder $e$, at the end of the arm $a$, engaging in the recess, and thus supporting the upper end of the pin, and forming in effect a tight-joint hinge. When the wings are arranged, as shown in fig. 1, the hinge becomes a left-hand one. By reversing them, as shown in fig. 2, it becomes a right-hand hinge. To make it a loose joint, so that the door can be removed, it is only necessary to swing or turn the arm $a$ around, as shown in fig. 4, and the door or blind can be lifted off the same as with the ordinary loose-joint hinge. By these means I construct a hinge that combines all the advantages of a fast and a loose joint, and that can be used as a right or left-hand hinge at will.

Having thus described my invention, what I claim, is—

1. A hinge, consisting of the wings A and B, in combination with the plates C, constructed and arranged as shown and described.

2. The arm $a$ attached to the pin that unites the wings, and having the shoulder $e$ thereon, as and for the purpose set forth.

G. R. NEBINGER.

Witnesses:
  W. H. SMITH,
  THOS. BINGHAM.